United States Patent [19]

Stager

[11] 4,220,172
[45] Sep. 2, 1980

[54] FIRE SAFE BUTTERFLY VALVE

[75] Inventor: Francis W. Stager, Stafford Springs, Conn.

[73] Assignee: Litton Industrial Products, Inc., East Hartford, Conn.

[21] Appl. No.: 910,604

[22] Filed: May 30, 1978

[51] Int. Cl.³ .................................. F16K 1/226
[52] U.S. Cl. ........................... 137/74; 251/173; 251/174; 251/306
[58] Field of Search ............... 251/173, 174, 306; 137/516.25, 516.27, 516.29, 72, 74

[56] References Cited

U.S. PATENT DOCUMENTS

| | | | |
|---|---|---|---|
| 2,913,218 | 11/1959 | Broz | 251/173 |
| 2,942,840 | 6/1960 | Clade | 251/174 |
| 3,077,331 | 2/1963 | Burtis | 251/173 |
| 3,077,332 | 2/1963 | Burtis | 251/173 |
| 3,077,902 | 2/1963 | Vickery | 251/174 |
| 3,153,427 | 10/1964 | Burtis | 251/173 |
| 3,174,495 | 3/1965 | Anderson et al. | 137/74 |
| 3,177,887 | 4/1965 | Priese | 137/74 |
| 3,346,234 | 10/1967 | Allen | 251/174 |
| 3,556,476 | 1/1971 | Haenky | 251/306 |
| 3,591,133 | 7/1971 | Miles | 251/173 |
| 3,834,663 | 9/1974 | Donnelly | 251/306 |
| 3,986,699 | 10/1976 | Wucik et al. | 251/173 |
| 3,990,465 | 11/1976 | Allen | 137/72 |
| 4,108,196 | 8/1978 | Calvert et al. | 137/72 |
| 4,130,285 | 12/1978 | Whitaker | 251/306 |
| 4,130,285 | 12/1978 | Whitaker | 251/173 |
| 4,160,460 | 7/1979 | Kemp | 137/72 |
| 4,162,782 | 7/1979 | Wilkins | 251/306 |

FOREIGN PATENT DOCUMENTS

| | | | |
|---|---|---|---|
| 7513865 | 11/1974 | Netherlands | 251/306 |
| 1010118 | 11/1965 | United Kingdom | 251/173 |

OTHER PUBLICATIONS

DuPont Bulletin T-13, 3/1970, "Properties, Processing and Applications of Teflon Fiber".

Primary Examiner—William R. Cline
Assistant Examiner—H. Jay Spiegel
Attorney, Agent, or Firm—Brian L. Ribando

[57] ABSTRACT

Disclosed is a butterfly valve comprising sealing means for a movable valve member in the form of a resilient high temperature destructible sealing ring and a resilient high temperature indestructible seating ring, both of which are normally preloaded into radial sealing engagement with the movable valve member. The high temperature destructible seating ring is the primary seal and the high temperature indestructible seating ring being a backup seal in one direction of flow and the high temperature indestructible seating ring is the primary seal in the opposite direction of flow. Upon destruction of the high temperature destructible seating ring, the high temperature indestructible seating ring is so retained and configured to provide bidirectional seating.

2 Claims, 4 Drawing Figures

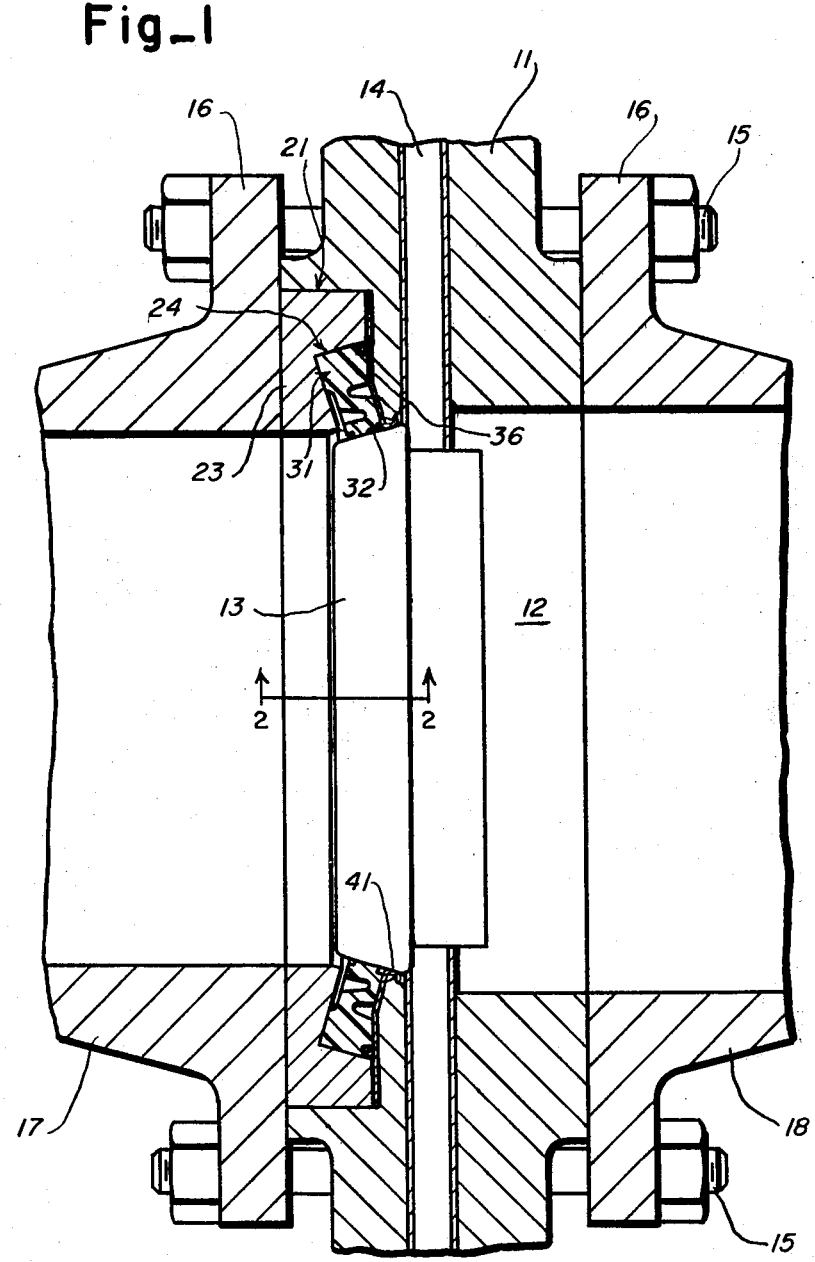

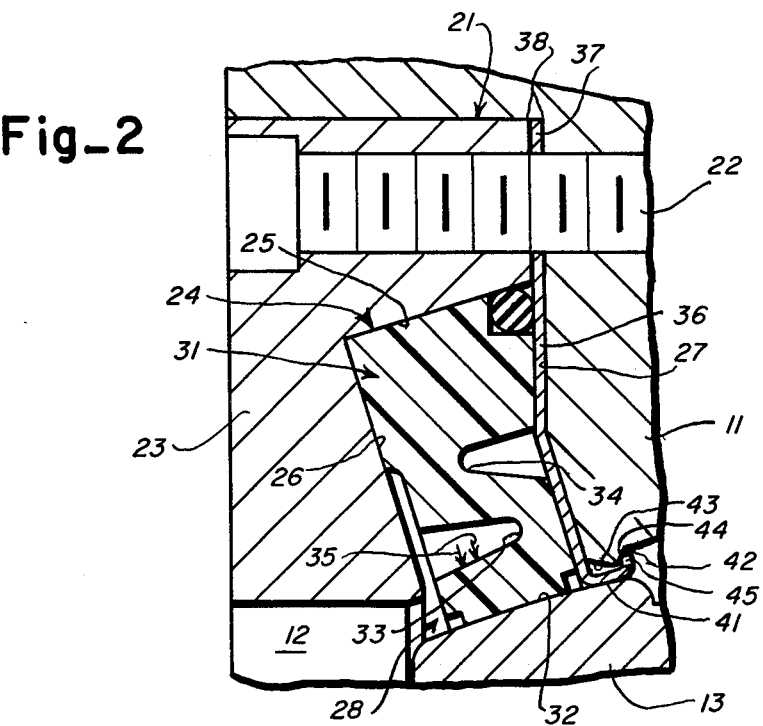
Fig_2
Fig_4
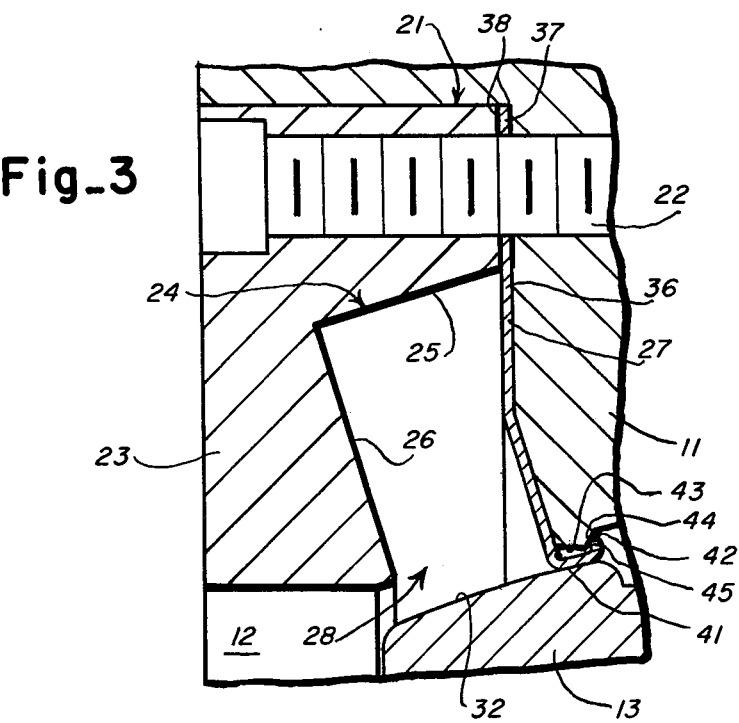
Fig_3

FIRE SAFE BUTTERFLY VALVE

This invention relates to butterfly valves; more particularly, it relates to butterfly valves having high temperature destructible and indestructible seating rings; and specifically, to a butterfly valve wherein the indestructible seating ring is normally preloaded against the movable valving element and retained in preload position by a retention formation in the wall of the valve body defining a fluid passageway.

Valves designed for use in lines conveying combustible materials such as hydrocarbons must provide sealing at normal temperatures and sealing at temperatures which would destroy seals of high temperature destructible materials. Prior art fire safe valves have provided indestructible seats which become effective when the destructible seat has been destroyed or which are effective in one direction only. However, in that seat destructive temperatures can occur to either side of the movable valve element, it is desirable to provide an indestructible seating element capable of effecting bidirectional sealing. Other desiderata are low cost valve assemblies which are simple to assemble and which do not require adjustment after assembly.

In accordance with the invention, a seating arrangement comprising a resilient destructible seating ring and a metallic indestructible seating ring are arranged to normally provide redundant bidirectional sealing at normal temperatures, with the metallic seating ring providing bidirectional sealing in the event the destructible resilient seating ring is destroyed by fire. The metallic seating ring is secured in the valve body adjacent to the resilient seat and extends radially inwardly to the flow passageway. The radially innermost end of the metallic seating ring is bent back on itself substantially 180° forming a substantially flat seating portion conforming to the sealing surface of a valve element and the terminal edge abuts and is retained by a formation in the wall of the valve body defining the flow passageway. The dimensions of wall formation are designed to achieve a desired preload of the curved seating portion against the valving element and to prevent movement of the seating ring in axial direction by fluid pressures thereby to provide bidirectional sealing. The metallic seating ring adjacent its seating portion is also provided with openings to allow pressure in one direction to enhance sealing by the fluid pressure. A valve in accordance with the invention is designed to provide bidirectional sealing within allowable leakage limits at pressures from 0 to 740 psi at normal temperatures as well as at temperatures which destroy the redundant destructible resilient seal.

An object of the invention is in the provision of a low cost, easily assembled fire safe high temperature butterfly valve.

Another object of the invention is to provide a bidirectional fire safe butterfly valve.

Still another object of the invention is in the provision of a metallic fire safe seating ring and retaining means therefor to allow the establishment of selected preloading and to provide for retentive force against line pressure from either direction.

Other objects, features and attendant advantages of the present invention will become better understood by those skilled in the art from a reading of the following detailed description when taken in conjunction with the accompanying drawing wherein like reference numerals designate like or corresponding parts throughout the views thereof and wherein:

FIG. 1 is a central vertical cross-sectional view through a butterfly valve assembly in accordance with the invention;

FIG. 2 is an enlarged partial cross-sectional view taken along lines 2—2 of FIG. 1;

FIG. 3 is a cross-sectional view similar to FIG. 2 after destruction of the high temperature destructible seal; and FIG. 4 is a partial perspective view of the flexible metal seating ring.

Referring now to the drawing wherein like reference numerals designate like or corresponding parts throughout the Figures, there is shown in FIG. 1 a butterfly valve assembly comprising a valve body 11 having a central flow passageway 12 configured to accommodate a valving element in the form of a disc 13 comprising a segment of a sphere. As viewed in FIG. 1, the larger diameter or right side of the disc 13 is secured to a valve control shaft 14 rotatably supported in the valve body 11 and whose axis of rotation is central to the axis of the sphere of which the disc 13 is a segment. The butterfly valve assembly is adapted to be secured to fluid flow lines as by bolts 15 extending through the body 11 and through flanges 16 of piping 17, 18 to either side of the valve assembly.

As best seen in FIGS. 2 and 3, the valve body 11 has an annular cutout generally designated by reference numeral 21 formed in the left side of the valve body 11 which extends radially outwardly from the valve passageway 12. Secured within the annular cutout 21 as by bolts 22 is a seat retainer ring 23 whose inner diameter also defines the fluid passageway 12 of the valve body to the left of the valve disc 13. The seat retainer ring 23 has a rightwardly canted or oblique cutout generally designated by reference numeral 24 whose radially outermost wall 25 and generally axially facing wall 26, together with the axially oppositely facing wall 27 of the cutout 21 in the side of the valve body 11 define a seating ring retainer recess generally designated by reference numeral 28 and best viewed in FIG. 3. The angle of cant of the recess 28 is designed to locate a resilient seating ring, generally designated by reference numeral 31, in a directional generally perpendicular to the sealing surface 32 of the movable disc 13. The walls 26 and 27 of the recess also form a wedge to axially sealingly retain the base or radially outermost portion of the resilient seating ring 31, whose axial dimensions are sufficiently larger than the wedge dimensions to provide effective axial sealing. The radial dimension of the seating ring 31 is such that its radially innermost end sealingly engages surface 32 of the valve disc 13.

The high temperature destructible resilient seating ring 31, preferably of polytetrafluoroethylene (TFE), known popularly as TEFLON, is formed with radially spaced axially directed grooves 33 and 34, the radially innermost groove 33 serving to enhance radial sealing pressure through action of fluid pressure from the left as indicated by arrows 35 in FIG. 2. Teflon is known to be stable and useable in the temperature range from 0°–400° F., to be unstable in the 400°–500° F. temperature range, and to melt above 600° F. As used herein, normal temperatures shall mean 0°–550° F. and high temperature shall mean above 550° F.

In accordance with the invention, a flat metal seating ring 36, a partial view of which is shown in FIG. 4, is formed with a radially outermost ring portion 37 which is securely sandwiched between the retainer ring 23 and the axially facing wall 27 of the cutout of the valve body 11 radially outwardly of the recess 28, and as viewed in the Figures to the right side of the resilient sealing ring 31. Graphite rings 38, sold under the trademark GRAFOIL, are placed to either side of ring portion to provide fire safe sealing. The seating ring 36 also extends into the recess 28 along the axially facing wall 27 of the cutout 21 in the left side of the valve body 11. It further extends into the fluid passageway 12 where the radially innermost portion is bent to the right and back substantially 180° on itself to form a seating surface 41 conforming to the sealing surface 32 of the valve disc 13. The radially outwardly directed terminal edge 42 of the ring is adapted on assembly to ride a ramp 43 and to lock behind an oppositely directed ramp 44 formed in the wall of the passageway 12 adjacent the opening to the recess 28. The amount of interference between the edge 42 and ramp 44 determines the preloading of the seating surface 41 of the ring 36 against the sealing surface 32 of the valve disc 13. The oppositely directed ramps 43 and 44 in conjunction with edge 42 also serve to minimize deformation, by retention of the edge 42, of the seating surface against line pressures from either side of the valve disc 13. Thus, the ramps 43 and 44 define a formation.

FIG. 3 shows the butterfly valve after the resilient seating ring 31 has been destroyed by fire. Under line pressure from the left, the flexible metallic seating ring 36 is backed up by the valve body wall 27 while deformation of the seating surface 41 out of sealing contact is resisted by reason of the interference contact of the edge 42 of the ring 36 with ramp 44 in the passageway wall.

Similarly, under pressure from the right, the contact of the edge 42 of the ring 36 with the ramp 44 in the wall of passageway 12 will resist deformation of seating surface 41. As shown in FIGS. 2 and 3, and FIG. 4 in particular, the edge 42 may be provided with notches 45 located at intervals, e.g. of 45°, to allow fluid pressure from the right access between the passageway wall and the bent out portion to enhance sealing pressure.

In high temperature applications where normally encountered temperatures are higher than the destruction temperature of the resilient seating ring 31, only the seating ring 36 would be employed.

The seating ring 36 may be of stainless steel or other high temperature metal such as Iconel, titanium, beryllium, etc. Further, both the sealing surface 32 of the disc 13 and the seating surface 41 of the seating ring 36 may be coated with metals to increase hardness and reduce wear.

The invention claimed is:

1. In a butterfly valve assembly operative at normal temperatures and at high temperatures for controlling fluid flow, the combination comprising:
   a movable valve member adapted to close said passageway,
   sealing means for providing bidirectional sealing with said valve member, said sealing means comprising a resilient seating ring which is destructible at high temperatures and a metallic seating ring which is indestructible at high temperatures,
   recess means for securing said seating rings in said valve body, said resilient and metallic seating rings extending into said passageway and forming two seating surfaces to provide redundant sealing with said valve member at normal temperatures, and
   ramp means in said passageway adjacent the opening to said recess in an interference fit with a turned back edge of said metallic seating ring to preload said metallic seating ring against said valve member and to retain said metallic seating ring against pressure from either side of said valve member, whereby said metallic seating ring provides bidirectional sealing with said valve member at high temperatures sufficient to destroy said resilient seating ring.

2. A butterfly valve assembly as recited in claim 1, said turned back edge of said metallic ring having notches for the admission of fluid to enhance sealing in one direction.

* * * * *